United States Patent [19]

Paxton et al.

[11] Patent Number: 4,837,613

[45] Date of Patent: Jun. 6, 1989

[54] METHOD OF COLOR SELECTION FOR DISPLAY AND PRINTING

[75] Inventors: William H. Paxton, Los Altos Hills; Michael D. Schuster, Redwood City; John E. Warnock, Los Altos, all of Calif.

[73] Assignee: Adobe Systems, Inc., Mountain View, Calif.

[21] Appl. No.: 239,299

[22] Filed: Sep. 1, 1988

[51] Int. Cl.$^4$ .......................... H04N 1/46; H04N 1/40
[52] U.S. Cl. ......................... 358/75; 358/78; 358/79; 340/701
[58] Field of Search ............................. 358/75, 78, 79; 340/701, 703

[56] References Cited

U.S. PATENT DOCUMENTS

| | | | |
|---|---|---|---|
| 4,614,967 | 9/1986 | Sayanagi | 358/75 |
| 4,680,596 | 7/1987 | Logan | 358/283 |
| 4,730,185 | 3/1988 | Springer et al. | 358/78 |
| 4,771,275 | 9/1988 | Sanders | 340/701 |

Primary Examiner—Howard W. Britton
Assistant Examiner—Kim Yen Vu

[57] ABSTRACT

The invention provides a method for selecting the intensity level of each of the primary colors for displaying or printing a predetermined, desired color to be composed of a specified percent of each of the primary colors. Each primary color has available a predetermined number of discrete intensity levels ranging from minimum to maximum and is to be displayed on a matrix having a predetermined number of cells. The first step in the method is to determine a desired intensity level for each primary color and to select the number of cells of the matrix which are to display that color at that intensity level. These cells of each primary color are then arranged in the matrix in a predetermined ordering to display the desired color. The sequence of the ordering is predetermined and the same for each primary color. The starting point of the sequence of one of the primary colors is fixed, but the starting point for each successive primary color is dependent upon the ending cell location of the sequence of cells for the preceeding color. Using the invention, the amount of color memory required is reduced because the number of storage cells required for storage of color selection information need only be equal to the product of the numbers of available intensity levels for each primary color.

4 Claims, 3 Drawing Sheets

FIGURE 1. BEAM INTENSITY VALUES (%)

| COLOR # | R | G | B | COLOR # | R | G | B | COLOR # | R | G | B |
|---|---|---|---|---|---|---|---|---|---|---|---|
| 0 | 0 | 0 | 0 | 12 | 1 | 0 | 0 | 24 | 2 | 0 | 0 |
| 1 | 0 | 0 | 1 | 13 | 1 | 0 | 1 | 25 | 2 | 0 | 1 |
| 2 | 0 | 1 | 0 | 14 | 1 | 1 | 0 | 26 | 2 | 1 | 0 |
| 3 | 0 | 1 | 1 | 15 | 1 | 1 | 1 | 27 | 2 | 1 | 1 |
| 4 | 0 | 2 | 0 | 16 | 1 | 2 | 0 | 28 | 2 | 2 | 0 |
| 5 | 0 | 2 | 1 | 17 | 1 | 2 | 1 | 29 | 2 | 2 | 1 |
| 6 | 0 | 3 | 0 | 18 | 1 | 3 | 0 | 30 | 2 | 3 | 0 |
| 7 | 0 | 3 | 1 | 19 | 1 | 3 | 1 | 31 | 2 | 3 | 1 |
| 8 | 0 | 4 | 0 | 20 | 1 | 4 | 0 | 32 | 2 | 4 | 0 |
| 9 | 0 | 4 | 1 | 21 | 1 | 4 | 1 | 33 | 2 | 4 | 1 |
| 10 | 0 | 5 | 0 | 22 | 1 | 5 | 0 | 34 | 2 | 5 | 0 |
| 11 | 0 | 5 | 1 | 23 | 1 | 5 | 1 | 35 | 2 | 5 | 1 |

|   | INTENSITY (%) | ADJACENT AVAILABLE LEVELS |
|---|---|---|
| R | 45 | 0, 50 |
| G | 10 | 0, 20 |
| B | 10 | 0, 100 |

METHOD OF COLOR SELECTION FOR DISPLAY AND PRINTING

BACKGROUND OF THE INVENTION

This invention relates to a method of color selection for display or printing of electronic color images. In particular, this invention relates to the conversion and storage of electrical images suitable for display on a color raster scan cathode ray tube (CRT) or for use in a color printer, such as an ink jet or other color graphic printer, for example, a laser scanning printer system.

Most color graphic systems require a large color palette. Generally, the more color variations a system can display or print, the better it is. Digital displays and printers currently available offer very dense displays or rasters, commonly 1,000 by 1,000 pixels. If each pixel is to be capable of displaying or storing any single discrete color of a palette, for example, one having 256 colors, there must be sufficient color memory available to store those colors. Assuming each color corresponds to the voltages on the three separate electron guns of a CRT or the controls of an ink jet, one for each primary color, three bytes of storage may be required for the color of each pixel. If three bytes is needed for each of a million pixels, a total of 3 megabytes of RAM is needed for solely color storage.

To reduce the memory needs and yet still provide adequate color gradations, halftone dot patterns, or color matrices, are used. If greatly magnified, these matrices look like discrete dot patterns, but will look to a viewer like the desired palette color when viewed from normal viewing distance.

Most prior art halftone or "dithering" techniques have used halftone matrices having certain pixels in the matrix turned on and certain pixels turned off. One example of such a system is described in U.S. Pat. No. 4,308,553 which issued on Dec. 29, 1981. More recent advances in halftone color printing and display have not only turned pixels on and off, but also have varied the color intensity of each pixel. Such a system is described in U.S. Pat. No. 4,412,225 which issued on Oct. 25, 1983. The halftone matrix technique used in this patent, as shown in FIGS. 7A and 7B, starts each color at a different corner of the matrix and increases the amount of that color, both by increasing the intensity of each pixel of the matrix and by increasing the number of cells of the matrix used for that color, in a growth pattern from the starting corner diagonally across the matrix until the matrix is saturated.

The problem with this type of a spreading algorithm is that it will produce an intensity imbalance even when viewed from a distance. Moreover, this system, with an intensity variation of 0 to 7, using a 3×3 matrix, requires at least over ten bytes of color memory for each matrix. For a 1K×1K display, greater than a megabyte of memory would be necessary.

It would thus be desirable to have a color display system which uses substantially less memory, but still provides as good or better color and intensity uniformity over the entire display or raster.

BRIEF DESCRIPTION OF THE INVENTION

Briefly, the invention provides a method for selecting the intensity level of each of the primary colors for displaying or printing a predetermined, desired color to be composed of a specified percent of each of the primary colors. Each primary color has available a predetermined number of discrete intensity levels ranging from minimum to maximum, and is to be displayed on a matrix having a predetermined number of cells N. The method of the invention comprises (1) determining a desired intensity level for each primary color and selecting the number of cells of the matrix which are to display that color at the desired intensity level; and (2) arranging the selected cells of each primary color in the matrix in a predetermined ordering to display the desired color, the sequence of the ordeing being predetermined and the same for each primary color, the starting point of the sequence for one of the primary colors being fixed, but the starting point for the sequence for each successive primary color being dependent upon the ending cell location of the sequence of cells for the preceding color.

In a preferred embodiment of the invention, each primary color is represented by two discrete intensity levels which approximate the specified percent for that color, one level L being below or equal to the specified percent and the other level H being above or equal to the specified percent. For each primary color, the method of the invention requires selecting the number of cells $N_L$ of the matrix of intensity level L and the number of cells $N_H$ of the matrix of intensity level H, wherein the number of cells in the matrix $N=N_L+N_h$. For each primary color, the cells of intensity level H and the cells of intensity level L are arranged in the matrix in a predetermined ordering to display the desired color, the sequence of ordering being predetermined and the same for each primary color. The starting point of the sequence for one of the sets of cells for one of the intensity levels of the first of the primary colors is fixed, but the starting point for the sets of cells of the one intensity level for each successive primary color being dependent upon the ending cell location of the set of cells for that same intensity level for the preceding color.

In order to determine the integral number of cells $N_L$ of the N cell matrix of intensity level L, and the integral number of cells $N_H$ of the matrix of intensity level H, where $N_H$ equals $N-N_L$, the method of the invention uses the formula:

$$P = \frac{N_L*L + (N - N_L)*H}{N}$$

to arrive at the nearest approximation of the desired intensity level P for the primary color, wherein P equals the desired percent intensity for the primary color expressed as a number from 0 to 100.

In a preferred embodiment, the discrete intensity level for each primary color is selected from a predetermined set of available intensity levels for that color. The product of the numbers of available intensity levels for each primary color is less than or equal to the number of storage cells available for the storage of color selection information.

Using the method of this invention, it has been found possible to obtain a very uniform color intensity distribution. Moreover, the amount of memory required to store the data representing a palette of colors is substantially reduced from what was required in the prior art. Using the techniques described herein, a very large, fine grain palette of colors may be faithfully reproduced from a relatively small amount of digital color data.

DESCRIPTION OF THE PRIOR ART

The following patents, while failing to disclose the method described and claimed herein, describe various techniques for representing halftone images: U.S. Pat. Nos. 4,308,553; 4,367,482; 4,412,225; 4,614,967; 4,674,861; 4,680,596; and 4,680,625.

DECRIPTION OF THE DRAWINGS

FIG. 1 is a graph relating beam intensity values to the selected discrete possible color intensity levels for each color.

DESCRIPTION OF A PREFERRED EMBODIMENT

Figure 2:
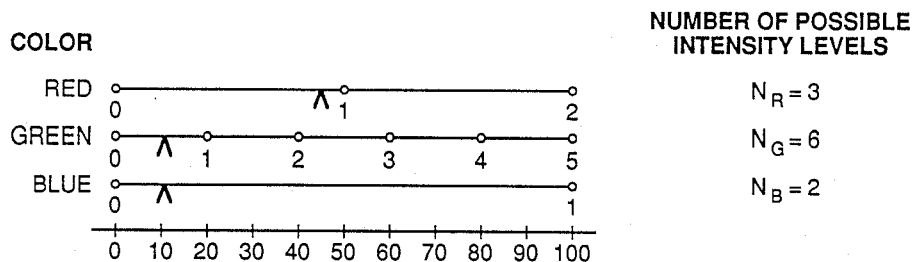
FIG. 2 is a table of colors for a particular example of the invention.

The method of this invention is used to select the intensity level of each of the primary colors for displaying or printing a predetermined, desird color to be composed of a specified percent of each of the three primary colors. In the method of the invention, each primary color has available a predetermined number of discrete intensity levels ranging from minimum intensity, which may be zero, to a maximum intensity, which may be the maximum power that the electron beam is capable of delivering, or, in the case of a printer, the amount of that color which fills a particular area with ink of the desired color. In ink jet printers, like CRTs, the intensity of each color is normally controlled by a voltage. In the case of a CRT, that voltage is used to control the intensity of an electron beam for that color. In the case of an ink jet printer, the voltage controls the flow of ink and thus the size of the ink drop which is deposited. The control of ink jet printers is described in U.S. Pat. No. 4,412,225, referenced earlier.

Most commonly, a CRT has one beam for each of the three primary colors, red, green and blue. In the case of a printer, in addition to the primary color inks, there may also be a supply of black ink because it is more efficient to use black ink for the color black than to combine the three primary colors, red, green and blue to achieve a black color. Moreover, although the usual primary colors are red, green and blue, it is sometimes preferable to use additive or subtractive primary colors, such a magenta, cyan and yellow, as employed in the method of color representation described in U.S. Pat. No. 4,412,225. The example selected for explanation in connection with this invention, however, employs the normal primary colors red, green and blue.

It is well known that the eye is more sensitive to certain colors than it is to other colors. In the case of the primaries, the eye is most sensitive to green, less sensitive to blue, with red being somewhere in the middle. Accordingly, if you have a limited number of discrete intensity level possibilities, it is preferable to have more gradations of green, for example, than of blue. The human eye will be better able to discern green gradations than it will gradations of blue or red.

In the color table example illustrated in FIG. 1, the intensity levels were selected using equal, discrete intensity intervals. However, they would not have to have been selected with equal intervals. Referring to FIG. 1, the six green beam intensity levels were selected at 20%, 40%, 60%, 80% and 100%, as shown in the table. However, these intervals could have equally well been selected non-linearly, or logarithmically, as desired. As will be explained later, it makes no difference to the method of the invention whether each of the intensity levels are equally spaced from the preceding and succeeding ones, or not.

Referring to FIG. 1, the color red has three possible discrete intensity levels, 0, 1 and 2. Intensity level 0 corresponds to 0% beam intensity; intensity level 1 corresponds to 50% beam intensity; and intensity level 2 corresponds to 100% beam intensity, as shown in the table. In the case of blue, only two intensity levels are used, intensity level 0 and level 1. Green has six intensities, 0, 1, 2, 3, 4 and 5, corresponding to 0%, 20%, 40%, 60%, 80% and 100%. Intensity level 1 is equivalent to a beam intensity of 100 percent.

The number of possible discrete intensity levels for each color, $N_R$ for red, $N_G$ for green and $N_B$ for blue are shown at the right side of the graph. In the example where $N_R$ equals 3, $N_G$ equals 6 and $N_B$ equals 2, the total number of combinations of intensity levels for the three primary colors is the product of these three numbers, or 36. A table using a numbering system based upon the possible number of intensity levels, having as the radix number for each color the number of possible intensity levels for that color, is shown in FIG. 2. Note that FIG. 2 is a table of 36 possible colors which combine the available discrete intensity levels of red, green and blue. Since there are only two possible blue intensity levels, the blue "B" column in FIG. 2 is binary, changing only from 0 to 1, the radix number being 2. Since there are six possible values of green, the green column varies from 0 to 5, the radix number being 6. With three possibilities of red, the red column varies from 0 to 2 and the radix number is 3.

Figures 3, 4:
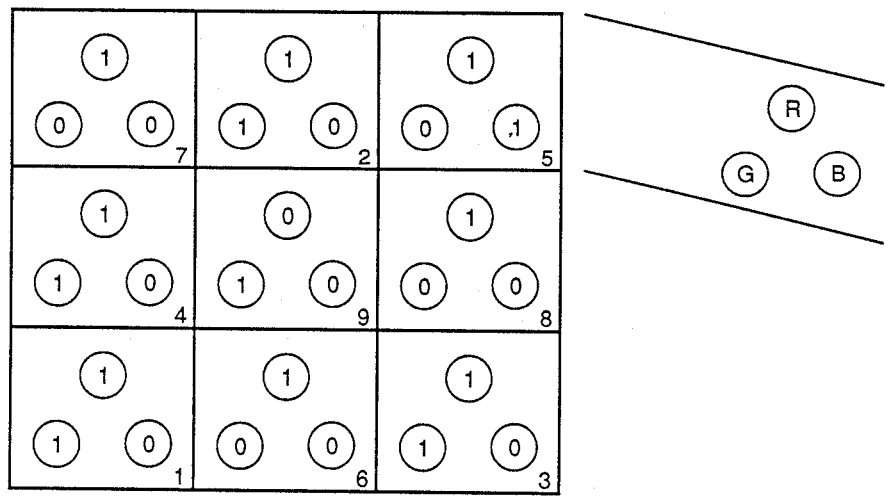
FIG. 3 is a table of intensity levels for an example of the invention.
FIG. 4 is a 3×3 matrix of colors in accordance with an example of the invention.

For illustration, the example shown in FIG. 3 will be used. It is assumed that the method of the invention is to be used to display a selected color as closely as possible, which is a combination of a red intensity of 45%, a green intensity of 10% and a blue intensity of 10%. Looking back at FIG. 1, it is apparent that there is no available discrete red intensity level of 45%. The pointer below the red line just to the left of intensity level 1 indicates where on the red intensity level of 45% would lie. Since no discrete level exists at 45%, this pointer lies between 0 and 50%, or 0 and 1 on the red line. Similar pointers show where the 10 percent intensity level lies for each of green and blue. Like red, neither green nor blue has a discrete, possible intensity level of 10% available.

According to the method of this invention, for each primary color, it is necessary to determine the two nearest discrete intensity levels approximating the specified percent for that color. One such level L lies below or equal to the specified percent, and the other such level, H, lies above or equal to the specified percent. Accordingly, for red, the nearest lower adjacent intensity level to 45% is 0%. The nearest higher percent intensity level is 50% oorresponding to the number 1. For green, the nearest lower intensity level is 0 and the nearest higher intensity level is 20%, corresponding to the number 1. For blue, the nearest lower percent again is 0, and the nearest higher percent is 100%, corresponding to the number 1.

Next, according to the method of the invention, for each primary color one selects an integral number of cells $N_L$ of a matrix of cells of intensity level L (the lower intensity) and an integral number of cells $N_H$ of intensity level H (the higher intensity level) where $N_H$ equals $N-N_L$, N being the total number of cells in the matrix.

In the example illustrated, a 3×3 matrix is used, having a total of 9 cells. Thus N equals 9. For displaying each primary color, each of those cells is filled with that color at an intensity level corresponding either to the higher or lower adjacent intensity levels H or L. A calculation is performed to ascertain how many of the 9 cells should contain, for each color, a beam of the higher intensity level, and how many should contain a beam of the lower intensity level.

The formula useful in making this calculation is:

$$P = \frac{N_L*L + (N - N_L)*H}{N}$$

where P equals the specified percent intensity for the selected primary color. For example, if one is calculating the cell distribution for red, whose desired intensity is 45, the desired P equals 45. L is the closest lower intensity percent for the red beam, which in this example is 0. H is the closest higher intensity percent, which for the red beam is 50. Solving the equation for $N_L$, with N=9, results in $N_L$=0.9. Rounding that to an integer tells one to use one cell of the lower intensity (0% in the case of red) for the red beam. $N-N_L$ equals 8. This tells one to use 8 of the 9 cells with the red beam at the higher adjacent intensity, which in this example is 50 percent. The actual P for red is 400/9, or 44.4%.

Making the same calculation for the green beam, the lower intensity nearest to 10% is 0 and the higher adjacent intensity is 20%. This results in 4 of the 9 cells of the matrix being of the lower intensity and the other 5 being of the higher intensity. Obviously, since 10% falls exactly at the midpoint between 0% and 20%, it makes no difference whether the larger number of cells is used for the higher intensity or for the lower. Indeed, the actual calculated result depends on when you do the rounding.

In the case of the blue beam, H equals 100% and L equals 0. Solving the equation for blue, $N_L$ equals 8.1 which rounds to 8. Accordingly, for blue, one uses 8 cells of the lower (0%) intensity and 1 cell of the higher (100%) intensity.

An important aspect of the invention is the arrangement within the matrix of the higher and lower intensity beams. In this invention, a unique arrangement algorithm is employed. First, it is necessary to choose a predetermined random arrangement pattern for the 9 cells of the matrix. Obviously the matrix need not have nine cells, and could have any number of cells, use any desired arrangement and need not be square.

One possible arrangement of the cells within the matrix is to start the first cell in a corner, for example, the lower left hand corner, labeling that cell as cell 1 (as shown in the lower right-hand corner of cell 1 shown in FIG. 4), and then to move as a knight moves on a chessboard. Knights move in an L-shaped pattern, either two squares in one direction and one square in the orthogonal direction, or vice versa. Starting at the lower left square 1 of the matrix of FIG. 4, if you move up two squares and to the right one square, you reach cell 2 of the matrix. Moving from cell 2 to the right one square and down two squares, just like the knight on a chessboard, you arrive at the lower right hand cell 3. Moving up one square and to the left two squares brings you to cell 4. This continues in L-shaped moves to cell 8, leaving all the cells numbered except the center cell, which therefore, by process of elimination, must be cell 9.

Many other sequences, random or sequential, may also be used. For example, it is possible to start counting in the center cell and wind around clockwise or counterclockwise to the outside. It isn't important what pattern is chosen, as long as it is followed consistently.

According to the previous calculations, it was determined that for red, 8 cells were to be designated at the higher intensity 1 and one cell at the lower intensity 0. For the color green, 5 cells are to be at the higher intensity 1 and 4 cells at the lower intensity 0. For the color blue, one cell is to be at the higher intensity 1 and the remaining 8 cells at the lower intensity 0.

It is a matter of choice which color you start out with in the matrix. In this example, assume one started with the color red. The higher intensity for red is shown on the color table of FIG. 1 as a 1. Note that the red beam in FIG. 4 is the upper center beam of the triangle R—G—B shown at the right of the Figure. This arrangement of the three colors is uniform throughout the nine cells. The algorithm determined that 8 red cells were to be at the higher intensity level. The higher intensity level of red is illustrated with the number 1, and it appears in cells 1, 2, 3, 4, 5, 6, 7 and 8. Note in the red circle of cell 9, at the top center, that a 0 appears, indicating the lower intensity for the red beam. The order of these 8 selected higher intensity cells is the predetermined order in accordance with the L-shaped selection algorithm described above.

The unique aspect of this invention will be evident when the second color, green, is disbursed. The higher adjacent intensity level H for green also happens to be a 1. For green, 5 high intensity level cells, or 1s, are required. For this second color, green, according to the invention, one does not start putting the 1s in cell 1 at the lower left-hand corner of the matrix as one did for the first color red. Instead, one starts at the next cell after the previous color left off. The last H, or 1 for the red color was placed in cell 8. Therefore the first H or 1 for the green color will be placed, as shown, in cell 9. Since cell 9 is the last cell of the 9 cells in the matrix, then the next number 1 for green is to be placed in cell 1, starting the count over again, as shown in FIG. 4. Similarly, 1s are also placed for higher intensity green in cells 2, 3 and 4, the next cells in the predetermined series, making a total of 5 green cells having the higher intensity level H or 1.

If each of the three beams for each of the cells of the matrix of FIG. 4 is illuminated with its appropriate intensity, the half-tone appearance of the matrix to the eye will be the predetermined selected color shown in FIG. 3, having a red intensity of 45%, a green intensity of 10% and a blue intensity of 10%. The reproduction will be extremely faithful even though only 36 possible combinations of colors are used in this example for each cell of the matrix.

Finally, for blue, only one cell of high intensity level H, or 1 is required. Since the series of Hs for the green cells left off at cell 4, this one H or 1 for the blue cell will be placed in cell 5.

It has been found that using the algorithm of this invention, following the selected intensity level pattern of one primary color from the previous, rather than starting over each time at cell 1, provides a substantially more uniform intensity distribution than could be accomplished using the techniques of the prior art.

Although the intensity levels used in the specific example described above all turned out to be a lower intensity of 0 and a higher intensity of 1, it is apparent from FIGS. 1 and 2 that other values could have been employed. For example, if the desired intensity level for green had been 63 percent, the selected lower and upper adjacent intensity levels would have been 3 and 4, respectively, rather than 0 and 1 as was the case in the example. Depending on where the desired green intensity was to be, between 60 and 80%, some fraction of the cells of the 9-cell matrix would have required a green beam of intensity 60%, or 3, and the remainder of the cells would have required the green beam of intensity level 4, or 80 percent, the calculation of these numbers being made as described above.

Figure 5:
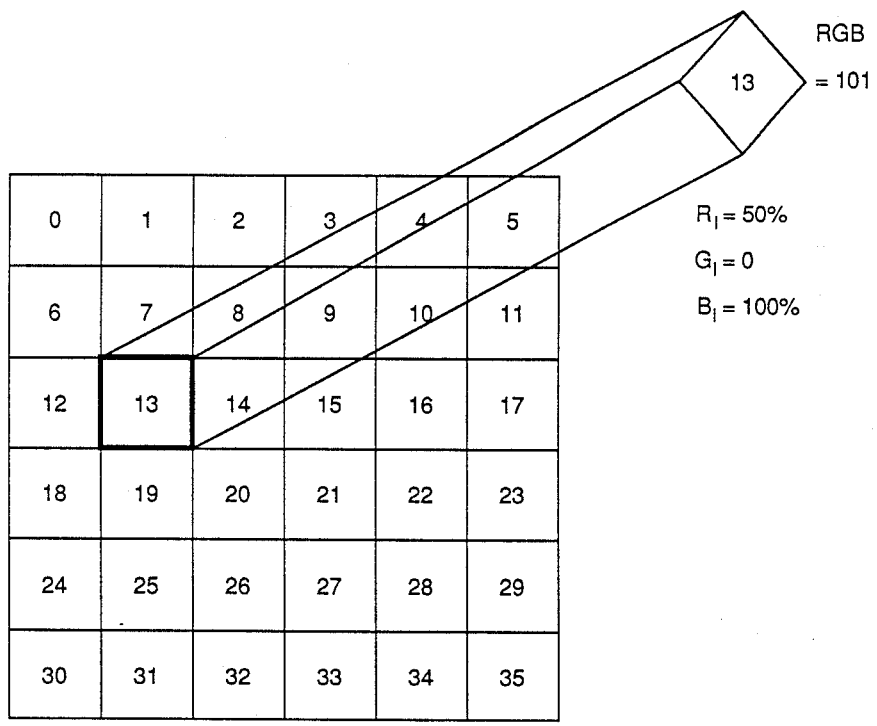
FIG. 5 shows the relationship between the available color palette from a color table and the selected beam intensities.

To reduce memory storage required, the 36 color palette shown in FIG. 2 can be stored in a 36 element array. To store each of the 36 colors, six binary bits are required, representing the color data for each color of the color table shown in FIG. 2. Referring to FIGS. 2 and 5, and in particular to color 13, that color corresponds to a red intensity level of 1, a green intensity level of 0 and a blue intensity level of 1. Therefore, address 13 corresponding to the radix number 13 in the array of FIG. 5 will contain color data for color 1-0-1 which is stored in the color table shown in FIG. 2. At that address, the color corresponding to 1-0-1 for radix number 13 is stored. If the color table of FIG. 2 is stored in the CRT, the color 1-0-1 (red=1, green=0, blue=1) is then translated by the CRT hardware to a red beam intensity of 50%, a green beam intensity of 0 and a blue beam intensity of 100%. In order to calculate any color number, which corresponds to a radix number N, it is only necessary to use the formula $N = R_{VAL} \times (N_G \times N_B) + G_{VAL}(N_B) + B_{VAL}$, where $N_G$ and $N_B$ are the number of possible intensity levels of green and blue, respectively, as shown in FIG. 1. The radix number 13 is arrived at for the above 1-0-1 example by multiplying the red value 1 by 12 (the product of the number of possible green levels 6 times the number of possible blue levels 2), and adding the green value 0 times the number of possible blue levels 2, plus the blue value 1.

Similarly, it is possible to translate the upper left-hand cell number 7 in FIG. 4, which uses a red intensity value of 1, and green and blue intensity values of 0, to a radix number 12 corresponding to color 12 in FIG. 2. Similarly, cell 2 translates to color 14 in FIG. 2.

Although the invention has been illustrated in connection with a preferred embodiment, it will be apparent that many of the details explained above may change without departing from the spirit and scope of the invention as set forth in the claims which follow.

We claim:

1. A method for selecting the intensity level of each of the primary colors for displaying or printing a predetermined, desired color to be composed of a specified percent of each of the primary colors, wherein each primary color has available a predetermined number of discrete intensity levels ranging from minimum to maximum, and wherein each primary color is to be displayed on a matrix having a predetermined number of cells, comprising:

determining a desired intensity level for each primary color and selecting the number of cells of said matrix which are to display that color at said intensity level;

arranging the selected cells of each primary color in said matrix in a predetermined ordering to display the desired color, the sequence of the ordering being predetermined and the same for each primary color, the starting point of said sequence for one of said primary colors being fixed, but the starting point for the sequence for each successive primary color being dependent upon the ending cell location of the sequence of cells for the preceding color.

2. A method for selecting the intensity level of each of the primary colors for the display or printing of a predetermined, desired color to be composed of a specified percent of each of the primary colors, wherein each primary color has available only a predetermined number of discrete intensity levels ranging from minimum to maximum, and wherein each primary color is to be displayed on a matrix having a predetermined number of cells N, comprising:

for each primary color, determining two discrete intensity levels approximating the specified percent for that color, one level L being below or equal to the specified percent and the other level H being above or equal to the specified percent;

for each primary color, selecting the number of cells of the matrix of intensity level L and the number of cells of the matrix of intensity level H;

for each primary color, arranging the cells of intensity level and the cells of intensity level L in said matrix in a predetermined ordering to display the desired color, the sequence of the ordering being predetermined and the same for each of said primary colors, the starting point of said sequence for one of the sets of cells of one of said intensity levels of the first of said primary colors being fixed, but the starting point for said one of the sets of cells of said one intensity level for each successive primary color being dependent upon the ending cell location of the set of cells of said one intensity level for the preceding color.

3. A method for selecting the intensity level of each of the primary colors for the display or printing of a predetermined, desired color to be composed of a specified percent of each of the primary colors, wherein each primary color has available only a predetermined number of discrete intensity levels ranging from minimum to maximum, and wherein each primary color is to be displayed on a matrix having a predetermined number of cells N, comprising:

for each primary color, determining the two discrete intensity levels most closely approximating the specified percent for that color, one level L being below or equal to the specified percent and the other level H being above or equal to the specified percent;

for each primary color, selecting an integral number of cells $N_L$ of the matrix of intensity level L and an integral number of cells $N_H$ of the matrix of intensity level H, where $N_H = N - N_L$, using the formula $$P = \frac{N_L * L + (N - N_L) * H}{N}$$

to arrive at the nearest approximation of the desired intensity level P for such primary color, wherein P=the specified percent for such primary color expressed as a number from 0 to 100; and for each primary color, arranging the cells of intensity level H and the cells of intensity level L in said matrix in a predetermined order to display the desired color.

4. A method for selecting the intensity level of each of the primary colors for the display or printing of a predetermined, desired color to be composed of a specified percent of each of the primary colors, wherein each primary color has available only a predetermined number of discrete intensity levels ranging from minimum to maximum, and wherein each primary color is to be displayed on a matrix having a predetermined number of cells N, comprising:

for each primary color, selecting the two discrete intensity levels most closely approximating the specified percent for that color, one level L being below or equal to the specified percent and the other level H being above or equal to the specified percent, said discrete intensity levels being selected from a predetermined set of available intensity levels for each color, the product of the numbers of available intensity levels for each primary color being less than or equal to the number of storage cells available for the storage of color selection information;

for each primary color, selecting the number and distribution of cells of the matrix of intensity level L and the number and distribution of cells of the matrix of intensity level H, the selection being made to create an average intensity of each primary color over the matrix so that, when the primary colors are combined in the matrix, the image of the desired color is reproduced.

* * * * *

UNITED STATES PATENT AND TRADEMARK OFFICE
CERTIFICATE OF CORRECTION

PATENT NO. : 4,837,613
DATED : 6/6/89
INVENTOR(S) : Paxton et al.

It is certified that error appears in the above-identified patent and that said Letters Patent is hereby corrected as shown below:

| | | |
|---|---|---|
| col. 01, line 34 | after "from" | insert --a-- |
| col. 02, line 10 | delete "ordeing" | insert --ordering-- |
| col. 02, line 26 | delete "$N_h$" | insert --$N_H$-- |
| col. 02, line 40 | delete "N cell" | insert --N-cell-- |
| col. 03, line 8 | delete "DECRIPTION" | insert --DESCRIPTION-- |
| col. 03, line 27 | delete "desird" | insert --desired-- |
| col. 04, line 63 | delete "oorresponding" | insert --corresponding-- |
| col. 05, line 25 | delete "45" | insert --45%-- |
| col. 06, line 10 | delete "isn t" | insert --isn't-- |
| Col. 8, line 35 | after "level" (1st occurrence) | insert --H-- |

Signed and Sealed this

Twenty-sixth Day of October, 1993

Attest:

BRUCE LEHMAN

Attesting Officer

Commissioner of Patents and Trademarks